United States Patent [19]

Mori et al.

[11] Patent Number: 5,329,602
[45] Date of Patent: Jul. 12, 1994

[54] OPTICAL FIBER COUPLER

[75] Inventors: Tsuneo Mori; Kazuo Koya, both of Gunma, Japan

[73] Assignee: Shin-Etsu Chemical Co., Ltd., Tokyo, Japan

[21] Appl. No.: 69,698

[22] Filed: May 28, 1993

[30] Foreign Application Priority Data

May 29, 1992 [JP] Japan .................. 4-163719

[51] Int. Cl.⁵ .................................. G72B 6/26
[52] U.S. Cl. ................................ 385/43; 385/51; 385/96
[58] Field of Search ............... 385/43, 96, 99, 51

[56] References Cited

U.S. PATENT DOCUMENTS 5,208,883 5/1993 Hattori et al. ................ 385/43

Primary Examiner—Frank Gonzalez
Attorney, Agent, or Firm—McAulay Fisher Nissen Goldberg & Kiel

[57] ABSTRACT

An improvement is proposed for decreasing the variation in the coupling ratio of an optical fiber coupler after a heat shock test. In an optical fiber coupler which is an elongated intergral body formed by fusing a plural number of optical fibers side-by-side consisting of two straightly columnar parts and a biconical part therebetween formed by drawing and adhesively bonded to a reinforcing base with a coating layer of an adhesive therebetween, the improvement can be achieved by limiting the zone where the coating layer of an adhesive to the surface of each of the straightly columnar parts within a range from the boundary between the straightly columnar part and the biconical part to a point 8 mm apart from the boundary.

1 Claim, 2 Drawing Sheets

— heat shock test
----- heat cycle test

OPTICAL FIBER COUPLER

BACKGROUND OF THE INVENTION

The present invention relates to an optical fiber coupler or, more particularly, to a reinforced optical fiber coupler provided with a reinforcing base plate adhesively bonded thereto exhibiting an excellent reinforcing effect so that the coupler can be used advantageously for coupling of optical fibers in various kinds of communication systems.

An optical fiber coupler is an indispensable part for the construction of optical communication systems and used for branching and combining of light under transmission through an optical fiber or wave-dividing and wave-synthesizing of light. Among various types of optical fiber couplers, those prepared by working on an optical fiber have excellent coupling adaptability and exhibit remarkably low loss of coupling so that they are widely used in practice for many applications.

An optical fiber coupler of the above mentioned type is prepared by fusing a plural number of optical fibers by heating followed by drawing of the bonded portion under a definite pulling force so as to form a biconical part between the straght-forward columnar parts. A problem in such an optical fiber coupler is the poor mechanical strength due to the decreased cross section of the biconical part so that it is necessary that the optical fiber coupler is used as fixed to a reinforcing member by adhesive bonding. Japanese Patent Kokai 3-107111 proposes a method for fixing an optical fiber coupler to a reinforcing member in which the adhesive used for the adhesive bonding is specified in respect of the Young's modulus and the adhesive bonding is effected at four points. Further, Japanese Patent Kokai 3-78712 proposes to specify the fixing length with an adhesive and spacing between the casing and the optical fiber. According to the disclosures, these methods are effective not only to increase the mechanical strength of the optical fiber coupler but also to improve the coupler so as to pass the temperature characteristic tests such as the heat cycle test by repeating cycles each consisting of heating at +85° C. and chilling at −40° C.

An optical fiber coupler prepared in the above described manner was actually subjected to a heat cycle test to give results that, although no great variation in the characteristics was caused in the ordinary heat cycle test, remarkable changes were caused in the coupling ratio of some of the tested couplers when they were subjected to a very severe heat shock test by the repetition of rapid chilling to −40° C. and rapid heating to +85° C. Accordingly, it is eagerly desired to develop a method for the solution of this problem.

SUMMARY OF THE INVENTION

The present invention accordingly has an object to provide a novel optical fiber coupler having an excellent reinforcing effect and still free from the above described problems in the conventional optical fiber couplers.

Thus, the optical fiber coupler of the present invention is an integral elongated body of a plural number of unit optical fibers fused together side-by-side consisting of two straightly col-umnar parts and a biconical or constricted part between the two straightly col-umnar parts and fixed to a reinforcing base by adhesively bonding with a coating layer of an adhesive therebetween, the coating layer of the adhesive being formed on the surface of each of the straightly columnar parts in a limited range from the boundary between the biconical part and the straightly columnar part to the point 8 mm apart therefrom.

DETAILED DESCRIPTION OF THE PREFERRED EMBODIMENTS

As is described above, the most characteristic feature of the inventive optical fiber coupler consists in that the reinforcing coating layer of an adhesive is formed on limited ranges of the straightly columnar parts of the coupler consisting of two straightly columnar parts and a biconical part therebetween. When a optical fiber coupler satisfies the above mentioned requirement, the coupler is not or little subject to the variation of the characteristic parameters such as the coupling ratio and transmission loss even after a heat shock test under extremely severe conditions.

Namely, it is essential in the inventive optical fiber coupler in order to obtain the above mentioned advantages that the coating layer of an adhesive for adhesively bonding the coupler to a reinforcing base is formed on limited ranges of the surface of each of the straightly columnar parts from the boundary between the biconical part and the straightly columnar part to a point 8 mm apart from the above mentioned boundary.

Figure 1:
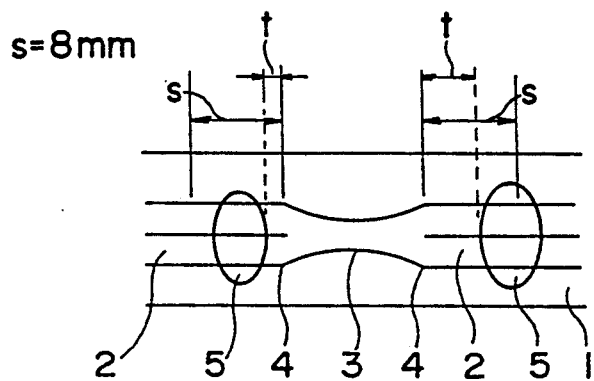
FIG. 1 is a schematic illustration of the inventive reinforced optical fiber coupler by a plan view showing the ranges in which the coating layer of an adhesive is provided on the surface on the coupler.

FIG. 1 schematically illustrates the inventive optical fiber coupler by a plan view. The optical fiber coupler is prepared according to a known method in which a plural number of optical fibers of, for example, fused silica glass are bonded together lengthwise or side-by-side by partial melting followed by drawing to form a biconical part 3 between the straightly columnar parts 2,2. The boundary 4 between the biconical part 3 and the straightly columnar part 2 here implied is defined to be the peripheral point at which the outer diameter of the coupler, which decreases from the straightly columnar part in the biconical part in a tapered fashion, is smaller by 5% than the straightly columnar part 2 of the coupler. The coating layer 5 of an adhesive is formed on the surface of each of the straightly columnar parts 2,2 within the range from the above mentioned boundary 4 to the point 8 mm apart from the boundary 4 shown by t in FIG. 1. When the coating layer 5 of an adhesive is formed to satisfy the above mentioned requirement, the optical fiber coupler is imparted with greatly improved stability against a very severe heat shock test between −40° C. and +85° C. showing only 1% or even smaller variation in the coupling ratio and 0.1 dB or smaller variation in the transmission loss. It is optional that the coating layer of an adhesive on each of the straightly columnar parts 2,2 is divided into two or more portions provided that the farthest portion from the boundary 4 does not go beyond the 8 mm limit from the boundary 4.

Figure 3:
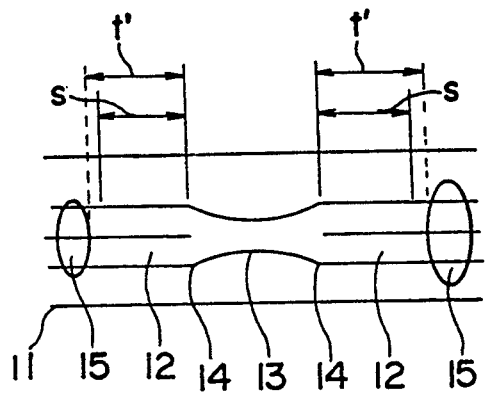
FIG. 3 is a schematic illustration of a comparative optical fiber coupler showing the ranges in which the coating layer of an adhesive is provided on the surface of the coupler.

When the coating layer of an adhesive on each of the straightly columnar parts 2,2 is formed beyond the 8 mm limit from the boundary 4 as is shown by the range t' in FIG. 3 to effect adhesive bonding with a reinforcing base 1, the variation in the coupling ratio is greatly increased to reach 2 to 6% after the heat shock test.

The adhesive to form the coating layer on the optical fiber coupler is not particularly limitative and modified acrylate resin-based adhesives conventionally used for the purpose can be used satisfactorily. Epoxy resin-based and methacrylate resin-based adhesives can also be used.

In the following, the optical fiber coupler of the present invention is described in more detail by way of an example and comparative example.

EXAMPLE AND COMPARATIVE EXAMPLE

Figure 2:
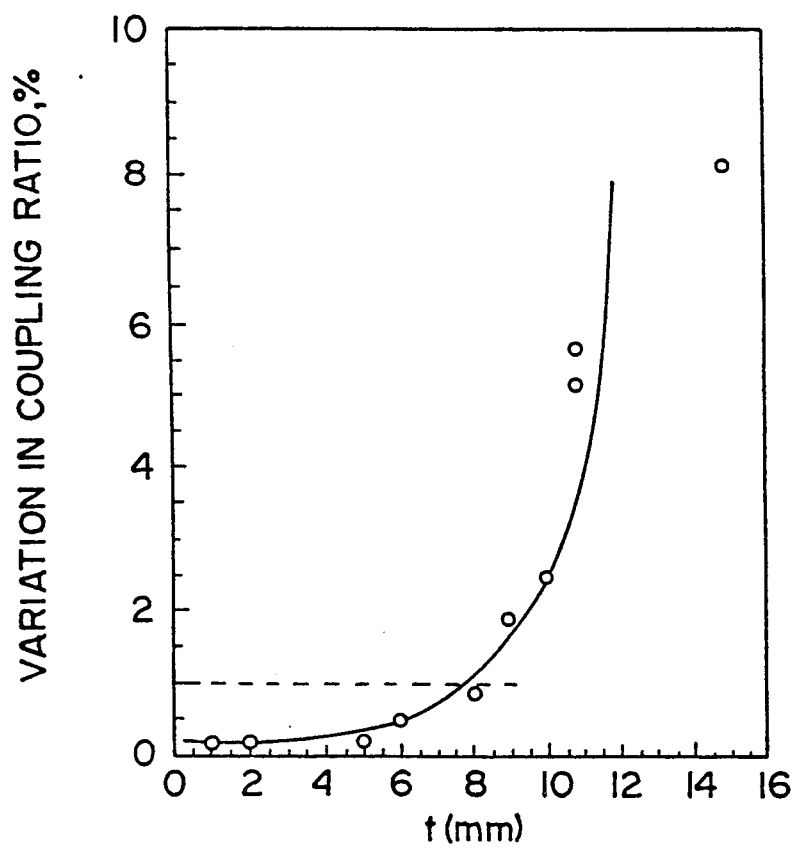
FIG. 2 is a graph showing the variation in the coupling ratio as a function of the length of the range in which the coating layer of an adhesive is provided on the straightly columnar parts of the coupler.
Figure 4:
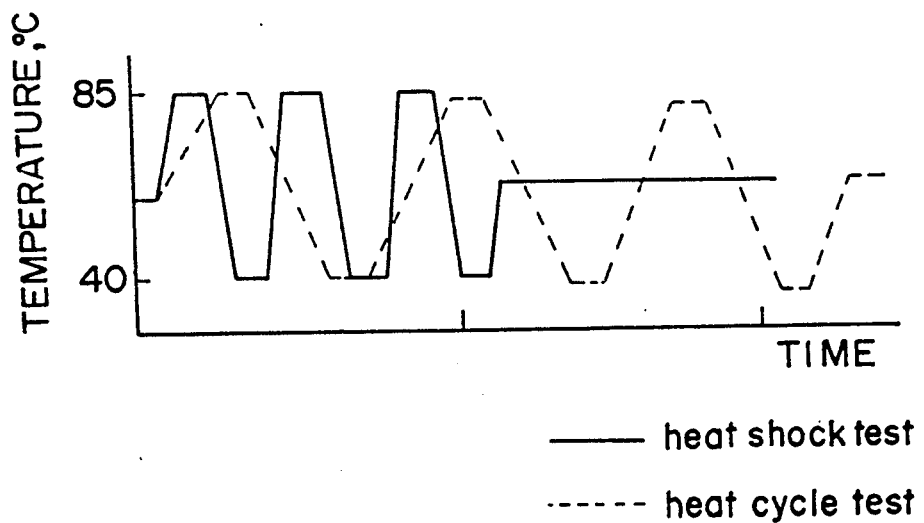
FIG. 4 is a graphic showing of the schedules in the heat cycle test and the heat shock test of the reinforced optical fiber couplers.

Two optical fibers of fused silica glass each having a diameter of 125 μm and a length of 4 meters were fused side-by-side by heating followed by drawing to form a biconical part 3 having a length of 16 mm and a smallest diameter of 45 μm between the straightly columnar parts 2,2. Each of the straightly columnar parts 2,2 was coated in the range from the boundary 4 with the bioconical part 3 to the point 8 mm apart from the boundary 4 with an acrylate resin-based adhesive in a coating thickness of 500 μm forming a reinforcing layer 5 thereon to be adhesively bonded to a reinforcing base plate of fused silica glass 1. The thus prepared optical fiber coupler was subjected to 5 cycles of the heat cycle test between −40° C. and +85° C. according to the heating and chilling schedule illustrated in FIG. 4, in which the test specimen was kept at −40° C. and +85° C. each for 20 minutes and the rates of temperature increase and temperature decrease were each 3.6° C./minute. Thereafter, the variation in the coupling ratio thereof was determined to give the results shown in FIG. 2 as a function of the length of the coated range t. As is understood from the figure, the variation in the coupling ratio after the heat cycle test was in the range from 0.2 to 1.0% when the coating layer with an adhesive was limited within the range from the boundary 4 to the point 8 mm apart therefrom.

In contrast to the above obtained results, the variation in the coupling ratio after the heat shock test was rapidly increased when the length of the coated zone with an adhesive was extended to a range of 9 mm to 15 mm from the boundary 4 between the biconical part 3 and the straightly columnar part 2. Namely, the values of the variation in the coupling ratio after the heat shock test were 2%, 2.5%, 5 to 5.5% and 8% when the length of the coated zone with the adhesive was 9 mm, 10 mm, 11 mm and 15 mm, respectively.

What is claimed is:

1. An optical fiber coupler which is an elongated integral body of a plural number of optical fibers fused together side-by-side consisting of two straightly columnar parts and a biconical part between the straightly columnar parts and adhesively bonded to a reinforcing base with a coating layer of an adhesive therebetween, the coating layer of the adhesive being formed on the surface of each of the straightly columnar parts within a range from the boundary between the biconical part and the straightly columnar part to the point 8 mm apart therefrom.

* * * * *